United States Patent [19]

Horvay et al.

[11] 3,732,646
[45] May 15, 1973

[54] REFRIGERATOR DOOR CONSTRUCTION

[75] Inventors: Julius B. Horvay; Earl H. Magester, both of Louisville, Ky.

[73] Assignee: General Electric Company, Louisville, Ky.

[22] Filed: Dec. 23, 1971

[21] Appl. No.: 211,526

[52] U.S. Cl. ...................49/487, 49/489, 49/501
[51] Int. Cl. ...............................E06b 7/16
[58] Field of Search...............49/478, 489, 486, 49/487, 388, 70, 501; 264/41

[56] References Cited

UNITED STATES PATENTS

| | | | |
|---|---|---|---|
| 3,137,900 | 6/1964 | Carbary | 49/478 X |
| 3,178,490 | 4/1965 | Petrino et al. | 264/41 |
| 3,242,537 | 3/1966 | Monti | 49/478 X |
| 3,289,352 | 12/1966 | Heilweil et al. | 49/478 X |

*Primary Examiner*—Kenneth Downey
*Attorney*—Walter E. Rule et al.

[57] ABSTRACT

A refrigerator door for closing the access opening to a refrigerated cabinet comprising a smooth skinned foamed plastic body member forming the outer surface of the door, a liner forming the inner surface of the door and an insert molded into the body member having an exposed channel portion for receiving and anchoring the edges of the liner. The insert also preferably includes a hollow anchoring portion extending along one side of the body member, the ends of which receive a thimble forming part of the hinge structure for pivotally mounting the door on a cabinet.

4 Claims, 4 Drawing Figures

3,732,646

REFRIGERATOR DOOR CONSTRUCTION

BACKGROUND OF THE INVENTION

For a number of years refrigerator cabinets and doors have been insulated with foamed polyurethane resin. In the manufacture of refrigerator doors, it has been the usual practice to position a metal outer door panel and a plastic inner door panel in spaced relationship and fill the space between the panels with polyurethane foam containing dichlorodifluoromethane as the foaming agent.

More recently, there has been made available compositions and techniques for producing integral skinned rigid polyurethane foams which in the as-molded form comprises a smooth outer surface or skin and a cellular interior. The rigid foam structures, as described for example in the article entitled "New Foams: More Variety, Easier Processing" in Materials Engineering, Vol. 69, No. 5, have been used in place of wood in the manufacture of furniture or parts thereof. While the desired formulation will depend upon the final use of the foamed product, reference is made to U.S. Pat. No. 3,178,490, Petrino et al., for a detailed description of the manufacture of various structural foamed articles having relatively dense and strong exterior skin-like surfaces which are smooth and non-porous.

SUMMARY OF THE INVENTION

The present invention has as its primary object the provision of an insulating door for refrigerator cabinets or the like having an outer panel or surface composed of a smooth skinned foamed plastic and an inner panel mounted thereon.

Briefly, the refrigerator door of the present invention comprises an integral skinned foamed plastic body member forming the outer surface of the door and having peripheral edge portions adapted to overlap the face portions of a refrigerator cabinet adjacent an access opening to the cabinet. The inner surface or panel of the door comprises a liner of plastic sheet material. Means for securing the liner to the body member comprises anchoring means in the form of inserts molded into the inner surface of the body member about the periphery thereof and spaced from the edges thereof. These inserts comprise a planar portion parallel to the adjacent surface of the body member and a flange portion spaced from the planar portion and forming therewith an inwardly facing channel for receiving the liner edge. The inserts also include an anchoring portion embedded in the foamed plastic and preferably this anchoring portion is of hollow or C-shaped cross section which on the hinged side of the door is adapted to receive tubular members forming hinge thimbles for receiving the hinge pin components of a supporting hinge structure.

DESCRIPTION OF THE PREFERRED EMBODIMENT

Figure 1:
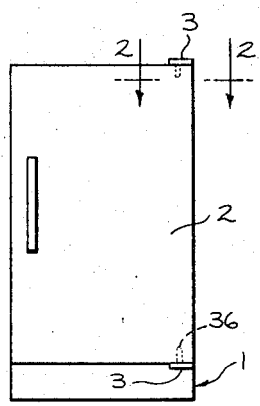
FIG. 1 is an elevational view of a refrigerator cabinet incorporating the present invention.

With reference to FIG. 1 of the accompanying drawing, there is shown a refrigerator 1 having a door 2 pivotally supported on the front of the cabinet by upper and lower hinges 3 for closing an access opening to the cabinet.

Figure 2:
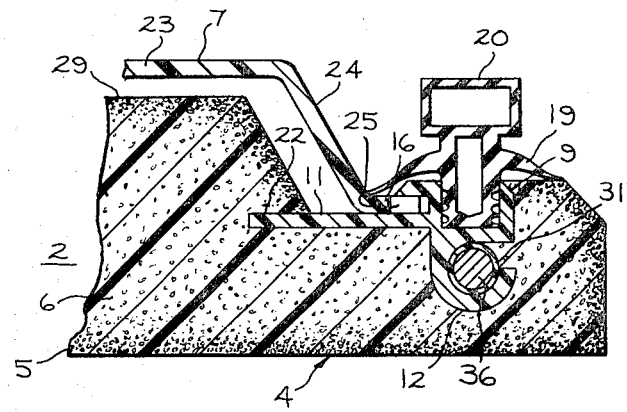
FIG. 2 is a sectional view of a portion of the door component of the cabinet taken along line 2—2 of FIG. 1.

In accordance with the present invention, this door 2 comprises, as shown more fully in FIG. 2 of the drawing, a rectangular body member 4 forming the front panel or front surface portion of the door 2. This body member 4 is a unitary structure foamed from a foamable plastic material to have a smooth, i.e., a high density outer skin 5 and a cellular, low density core 6 providing most of the thermal insulation in the final door assembly. Preferably, the body member 4 is made of a foamable polyurethane resin employing dichlorodifluoromethane as the blowing agent, the process for molding such a foamed body member having an impervious surface being described for example in U.S. Pat. No. 3,178,490, Petrino et al.

The door further includes an inner panel or liner forming the rear or inner surface of the door, this inner liner 7 being of the same rectangular shape as the body member 4 but of somewhat smaller vertical and horizontal dimensions in order that the liner 7 can be conveniently mounted on the body member 4 by means of an anchoring member generally indicated by the number 9.

Figure 4:
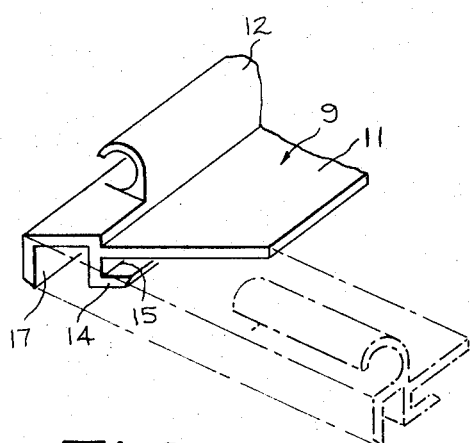
FIG. 4 is a fragmentary perspective view of a portion of the anchoring inserts means for securing the inner and outer panels of the door.

The anchoring members 9 preferably extending along the four edges of the door and spaced inwardly therefrom are conveniently formed of an extruded material such as extruded polyvinylchloride or aluminum. As shown in FIGS. 2 and 4 of the drawing, each includes a planar portion 11, an anchoring portion 12, a flange portion 14 spaced from the planar portion 11 defining an inwardly facing channel 15 for receiving an edge 16 of the inner panel 7, and walls defining a rearwardly opening slot or recess 17 for receiving the base portion 19 of a gasket 20.

The insert 9 is molded into the body member 4 during the molding thereof, the position of the insert being shown in FIG. 2 of the drawing. The planar portion 11 forms a portion of the inner surface of the body member 4 with the extreme end or edge 22 extending into or, in other words, embedded in the plastic material thus providing a part of the anchorage of the insert. The principle anchoring portion 12 of the insert is completely embedded within the body member 4 while the slot or recess 17 is exposed for receiving the gasket 20.

Figure 3:
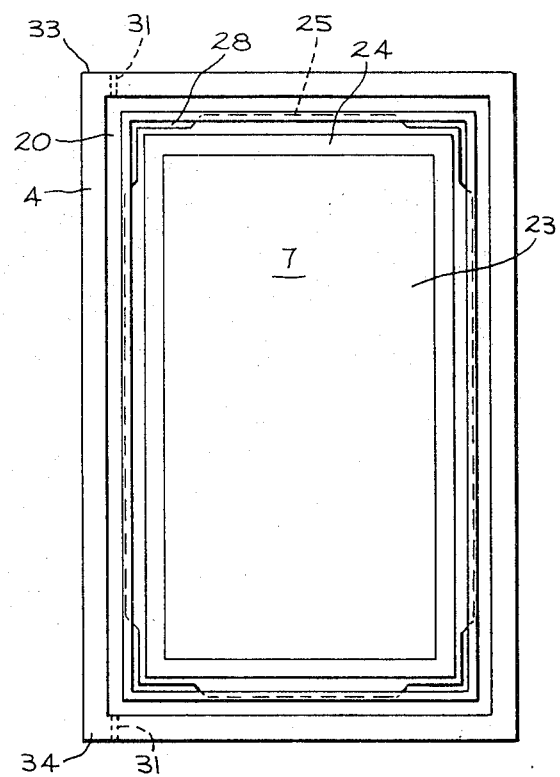
FIG. 3 is a view of the inner or rear surface of the door.

The flange 14, or more specifically, the channel 15, opening inwardly or toward the center of the door structure, is also exposed and is dimensioned to snugly receive an edge 16 of the liner 7 as shown in FIG. 2. In order to facilitate assembly of the liner 7 onto the body member 4 the liner 7 is shaped to include a relatively flat large central surface portion 23 having forwardly extending flanges 24 about the four sides thereof terminating in outwardly extending edges 25 adapted to be positioned within the slots 15. As the inner liner 7 is formed of a sheet plastic material, it is sufficiently flexible so that it can be bent sufficiently to permit the edges 16 to be slid into slots 15. To facilitate this operation the portions of the edges 25 adjacent the four corners of the panel 7 are cut away as indicated by the numeral 28 in FIG. 3 of the drawing.

Also to facilitate assembly of the two principle door components and to provide an insulating dead air space between the body member 4 and the liner 7 the inner surface 29 of the body member is preferably spaced a short distance from the center portion of the liner.

By this construction in which the edges of the inner panel 7 are anchored solely by the channels 15, the panel is free floating which prevents the body member 4 from being stressed when the panel 7 shrinks due to the lower refrigerator temperatures.

Further, in accordance with the present invention, the anchoring portion 12 is preferably employed as means for conveniently mounting or pivotally hinging the door 2 on the face of the cabinet 1. To this end the anchoring portion 12 is preferably C-shaped so that a tubular member 31 can be inserted into the ends of the C-shaped anchor adjacent the upper and lower corners 33 and 34 of the hinge side of the door, these tubular members extending through the upper and lower edges of the door for receiving pins 36 forming part of the hinge structure 3 mounted on the face of the cabinet.

The C-shaped cross section also serves to securely anchor the inserts in the body member as foam resin enters the open side of the C so that the C in effect hooks the insert into the body member.

From the above description it will be seen that there has been provided a refrigerator door in which the body member 4 forms not only the outer panel but also the principle structural and insulating member of the door, this body member including a molded-in anchoring insert for securing the liner 7 to the body member 4 and including means for anchoring a sealing gasket on the inner surface of the door and supporting portions of the hinge structure for pivotally supporting the door on the face of the cabinet. The outer surface of the body member 4 may be smooth or plain or may, by the use of suitable mold design, be given a wood grain or other surface pattern.

While it has been shown and described a particular embodiment of the invention it will be understood that it is not limited thereto and it is intended by the appended claims to cover all such modifications as fall within the true spirit and scope of the invention.

We claim:

1. A refrigerator door comprising:
   an integral skinned rigid foamed plastic body member of rectangular shape forming the outer surface of said door and including peripheral edge portions for overlapping the face portions of a cabinet adjacent an access opening thereto;
   a rectangular liner forming the inner surface of said door and spaced from the inner surface of said body member;
   means for securing said liner to said body member comprising an insert molded into the inner surface of said body member about the periphery thereof;
   said insert comprising walls defining a channel for receiving the edge of said liner and an anchoring portion embedded in the foamed plastic body member;
   said insert anchoring portion along one side of said door being substantially C-shaped and including tubular members extending into the opposite ends of said C-shaped anchoring portion on one side edge of the door forming hinge thimbles for receiving hinge pins for pivotally supporting the door on a cabinet.

2. A refrigerator door comprising:
   an integral skinned foamed plastic body member of rectangular shape forming the outer surface of said door and including peripheral edge portions for overlapping the face of a cabinet adjacent an access opening thereto;
   a rectangular liner forming the inner surface of said door;
   means for securing said liner to said body member comprising an insert molded into the inner surface of said body member about the periphery thereof and spaced from the edges thereof;
   said insert comprising a planar portion parallel to the adjacent surface of said body member and flange portion spaced from said planar portion and forming therewith an inwardly facing channel for receiving the edge of said liner and an anchoring portion embedded in the foamed plastic;
   said insert anchoring portion along one side of said door being substantially C-shaped; and
   tubular members extending into the opposite ends of said C-shaped anchoring portion at the upper and lower corners of one side of said member forming hinge thimbles for receiving hinge pins.

3. A refrigerator door according to claim 1 in which said insert includes walls defining a recess on the inner surface thereof for receiving and supporting a sealing gasket.

4. A refrigerator door according to claim 2 in which said insert includes walls defining a recess on the inner surface thereof and a sealing gasket having a base portion disposed in said recess.

* * * * *